(12) United States Patent
Sawin et al.

(45) Date of Patent: Feb. 26, 2019
(10) Patent No.: US 10,219,105 B1

(54) APPARATUS AND METHOD FOR DISTANCE-BASED OPTION DATA OBJECT FILTERING AND MODIFICATION

(71) Applicant: Groupon, Inc., Chicago, IL (US)

(72) Inventors: Emma Sawin, Chicago, IL (US); Daniel M. Roarty, Chicago, IL (US); Boris Lerner, Chicago, IL (US); Amber Roy Chowdhury, Bellevue, WA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 15/840,536

(22) Filed: Dec. 13, 2017

Related U.S. Application Data

(60) Provisional application No. 62/434,157, filed on Dec. 14, 2016.

(51) Int. Cl.
| | | |
|---|---|---|
| *H04W 24/00* | (2009.01) | |
| *H04W 4/02* | (2018.01) | |
| *G01S 13/46* | (2006.01) | |

(52) U.S. Cl.
CPC ............. *H04W 4/02* (2013.01); *G01S 13/46* (2013.01); *G01S 2013/468* (2013.01)

(58) Field of Classification Search
CPC .. H04W 4/02; H04W 64/00; H04L 29/08657; H04L 29/08108; H04L 29/08936; G01S 5/0252; G01S 5/02; G01S 5/14; H04M 1/72572; G01C 21/20
See application file for complete search history.

(56) References Cited

U.S. PATENT DOCUMENTS

| | | | | |
|---|---|---|---|---|
| 9,645,221 | B1* | 5/2017 | Heizer | G06Q 30/0255 |
| 2006/0123014 | A1* | 6/2006 | Ng | G06F 17/30864 |
| 2008/0084973 | A1* | 4/2008 | Verlare | G06Q 10/107 379/88.17 |
| 2012/0109752 | A1* | 5/2012 | Strutton | G06Q 30/0261 705/14.58 |
| 2014/0156388 | A1* | 6/2014 | Winters | G06Q 30/0246 705/14.45 |
| 2014/0274145 | A1* | 9/2014 | Cronin | H04W 4/021 455/456.3 |
| 2014/0310267 | A1* | 10/2014 | Spivak | G06Q 10/02 707/723 |
| 2015/0120455 | A1* | 4/2015 | McDevitt | G06Q 30/0261 705/14.58 |
| 2016/0241997 | A1* | 8/2016 | Lucas | H04W 4/021 |
| 2018/0247284 | A1* | 8/2018 | Novick | G06Q 30/02 |

\* cited by examiner

*Primary Examiner* — Dai Phuong
(74) *Attorney, Agent, or Firm* — Alston & Bird LLP

(57) ABSTRACT

An apparatus, method, and computer program product are provided to filter and modify option data objects and weighted values associated with option data objects through the application of specific rule sets based on the relative density of option data objects within a particularized area. In some example implementations, option data objects and related parameters are parsed to identify locations associated with the option data object and a weighted value, such as a weighted value generated by a predictive model. Based at least in part on the location associated with the option data object, a determined location of a user of a mobile device, and location-specific distance criteria, the weighted value associated with the option data object may be modified to reflect distance-related option election probabilities.

20 Claims, 4 Drawing Sheets

APPARATUS AND METHOD FOR DISTANCE-BASED OPTION DATA OBJECT FILTERING AND MODIFICATION

CROSS-REFERENCE TO RELATED APPLICATIONS

This application claims the benefit of U.S. Provisional Application No. 62/434,157, titled "Apparatus and Method for Distance-Based Option Data Object Filtering and Modification," filed Dec. 14, 2016, which is incorporated by reference herein in its entirety.

TECHNICAL FIELD

An example embodiment relates generally to systems that allow for the filtering and modification of data objects in an efficient manner. Example implementations are particularly directed to systems, methods, and apparatuses for filtering and modifying option data objects and weighted values associated therewith based on one or more automatically derived distance measurements and related particularized rule sets.

BACKGROUND

Many users of mobile devices now rely heavily on the use of such mobile devices to identify and interact with systems and other entities that are located within a geographic area surrounding the user. The inventors of the invention disclosed herein have identified a number of technical and operational challenges to be addressed in such environments, and have developed the solutions disclosed herein to overcome such challenges.

BRIEF SUMMARY

An apparatus, computer program product, and method are therefore provided in accordance with an example embodiment in order permit the efficient distance-based filtering and modification of option data objects and weighted values associated therewith. In this regard, the method, apparatus and computer program product of an example embodiment provide for calculation of an updated weighted value associated with an option data object based on a set of rules associated with a determined location of a user, option data object parameters (including, for example, an option data object location), and a derived distance parameter associated with a geographic area that encompasses the location of the user.

In an example embodiment, an apparatus is provided, the apparatus comprising a processor and a memory, the memory comprising instructions that configure the apparatus to: determine a triangulation location of a user; determine a predefined geographic area that encompasses the triangulation location of the user; receive a predetermined distance parameter associated with the predefined geographic area; receive a set of option data objects associated with the user; extract a set of option data object parameters from each option data object within the set of option data objects, wherein the option data object information comprises: an identification of a location associated with the option data object; and a weighted value generated by a predictive model; calculate, based at least in part on the location associated with the option data object, the triangulation location of the user, and the predefined geographic area, a distance associated with the option data object; determine whether the distance associated with the option data object exceeds the predetermined distance parameter; and in response to determining whether the distance associated with the option data object exceeds the predetermined distance parameter, calculate an updated weighted value.

In some example implementations of such an apparatus, the set of option data objects associated with the user comprises a set of option data objects associated with a category selected by the user. In some such example implementations, and in other example implementations, the triangulation location of the user is based at least in part on a triangulation location of a mobile device associated with the user. In some such example implementations, and in other example implementations, the predetermined distance parameter associated with the predefined geographic area is based at least in part on a density of option data objects within the predefined geographic area.

In some example implementations, the predetermined distance parameter associated with the predefined geographic area is based at least in part on a distance between a reference point within the predefined geographic area and a location associated with one or more option data objects. In some such example implementations, and in other example implementations, the distance associated with the option data object is based at least in part on a distance between the location associated with the option data object and the triangulation location of the user and the distance between the triangulation location of the user and the reference point associated with the predefined geographic area. In some such example implementations, and in other example implementations, calculating an updated weighted value associated with the option data object comprises associating a scaling factor with the option data object.

In another example embodiment, a computer program product is provided, the computer program product comprising at least one non-transitory computer-readable storage medium having computer-executable program code instructions stored therein, the computer-executable program code instructions comprising program code instructions configured to: determine a triangulation location of a user; determine a predefined geographic area that encompasses the triangulation location of the user; receive a predetermined distance parameter associated with the predefined geographic area; receive a set of option data objects associated with the user; extract a set of option data object parameters from each option data object within the set of option data objects, wherein the option data object information comprises: an identification of a location associated with the option data object; and a weighted value generated by a predictive model; calculate, based at least in part on the location associated with the option data object, the triangulation location of the user, and the predefined geographic area, a distance associated with the option data object; determine whether the distance associated with the option data object exceeds the predetermined distance parameter; and in response to determining whether the distance associated with the option data object exceeds the predetermined distance parameter, calculate an updated weighted value.

In some example implementations of such a computer program product, the set of option data objects associated with the user comprises a set of option data objects associated with a category selected by the user. In some such example implementations, and in other example implementations, the triangulation location of the user is based at least in part on a triangulation location of a mobile device associated with the user. In some such example implementations, and in other example implementations, the predetermined distance parameter associated with the predefined geographic area is based at least in part on a density of option data objects within the predefined geographic area.

In some example implementations, the predetermined distance parameter associated with the predefined geographic area is based at least in part on a distance between a reference point within the predefined geographic area and a location associated with one or more option data objects. In some such example implementations, and in other example implementations, the distance associated with the option data object is based at least in part on a distance between the location associated with the option data object and the triangulation location of the user and the distance between the triangulation location of the user and the reference point associated with the predefined geographic area. In some such example implementations, and in other example implementations, calculating an updated weighted value associated with the option data object comprises associating a scaling factor with the option data object.

In another example embodiment, a method for option data object filtration and modification is provided, the method comprising: determining a triangulation location of a user; determining a predefined geographic area that encompasses the triangulation location of the user; receiving a predetermined distance parameter associated with the predefined geographic area; receiving a set of option data objects associated with the user; extracting a set of option data object parameters from each option data object within the set of option data objects, wherein the option data object information comprises: an identification of a location associated with the option data object; and a weighted value generated by a predictive model; calculating, based at least in part on the location associated with the option data object, the triangulation location of the user, and the predefined geographic area, a distance associated with the option data object; determining whether the distance associated with the option data object exceeds the predetermined distance parameter; and in response to determining whether the distance associated with the option data object exceeds the predetermined distance parameter, calculate an updated weighted value.

In some example implementations of such a method, the set of option data objects associated with the user comprises a set of option data objects associated with a category selected by the user. In some such example implementations, and in other example implementations, the triangulation location of the user is based at least in part on a triangulation location of a mobile device associated with the user. In some such example implementations, and in other example implementations, the predetermined distance parameter associated with the predefined geographic area is based at least in part on a density of option data objects within the predefined geographic area.

In some example implementations, the predetermined distance parameter associated with the predefined geographic area is based at least in part on a distance between a reference point within the predefined geographic area and a location associated with one or more option data objects. In some such example implementations, and in other example implementations, the distance associated with the option data object is based at least in part on a distance between the location associated with the option data object and the triangulation location of the user and the distance between the triangulation location of the user and the reference point associated with the predefined geographic area. In some such example implementations, and in other example implementations, calculating an updated weighted value associated with the option data object comprises associating a scaling factor with the option data object.

BRIEF DESCRIPTION OF THE DRAWINGS

Figure 1:
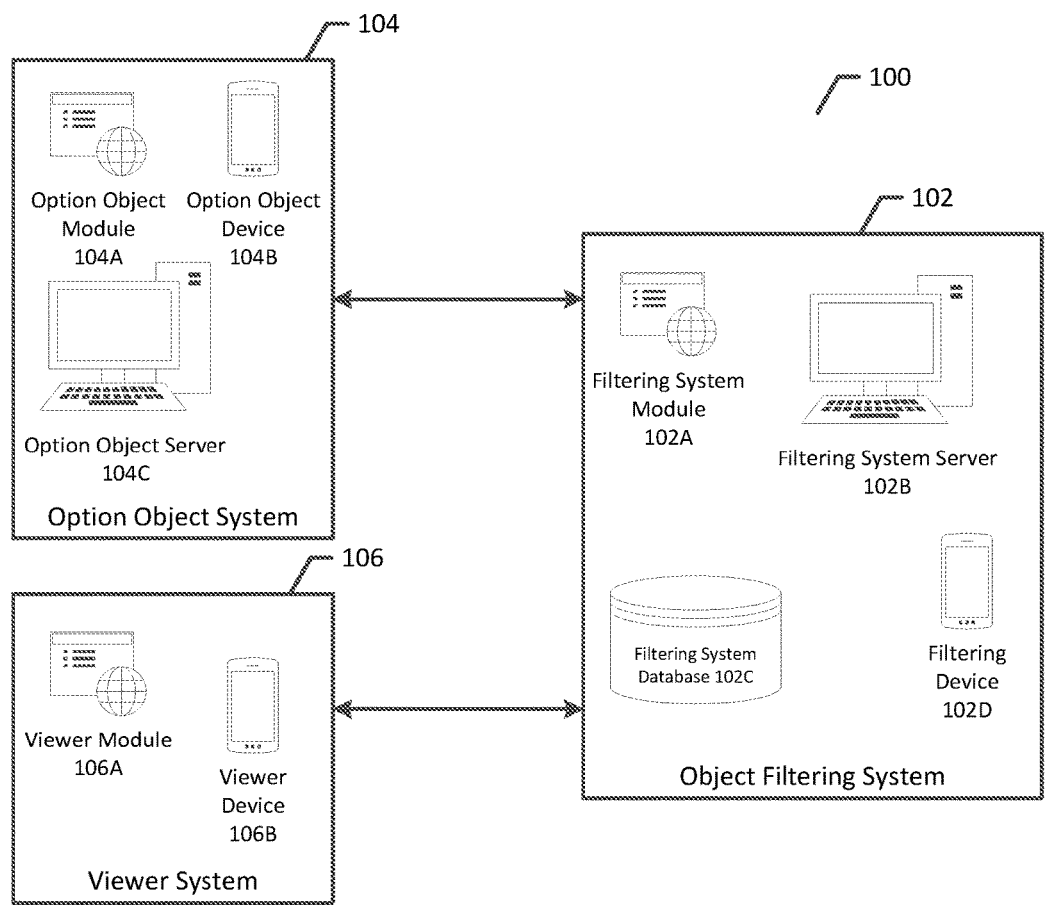
Figure 2:
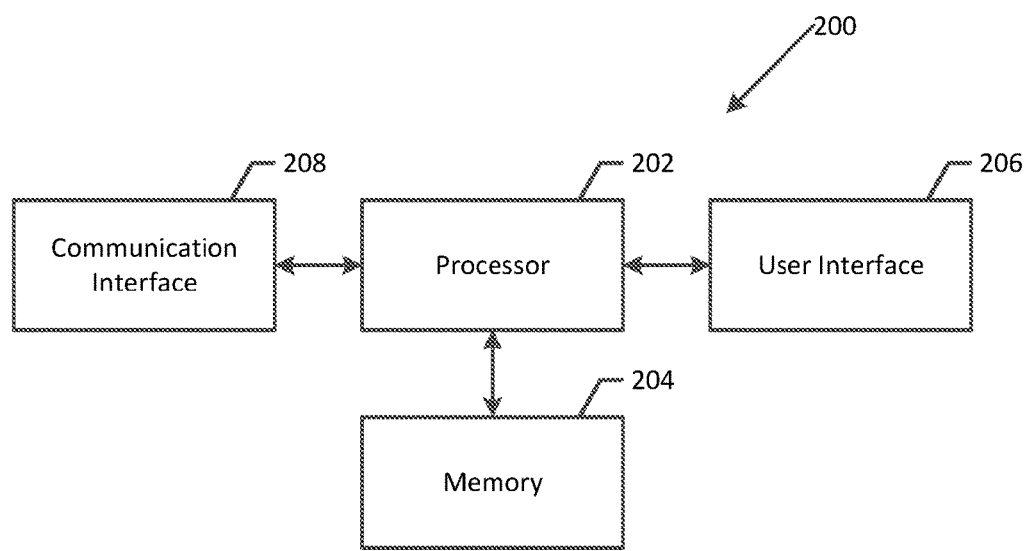
Figure 3:
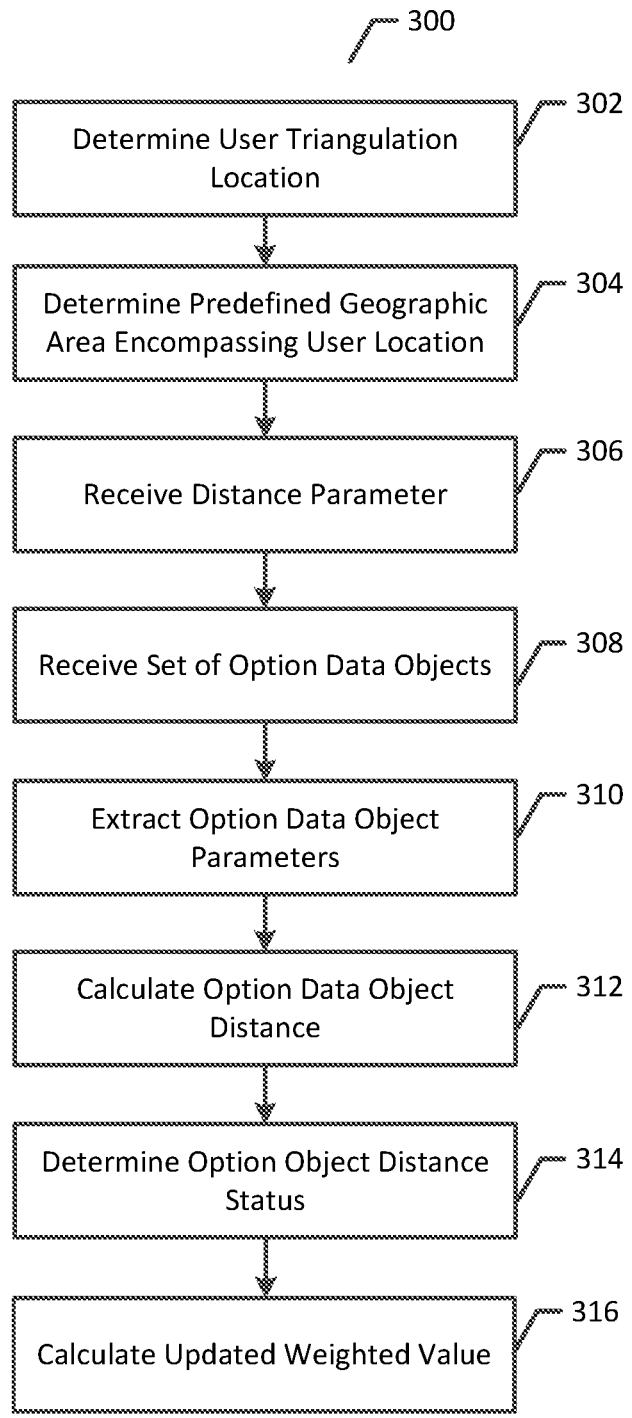
Figure 4:
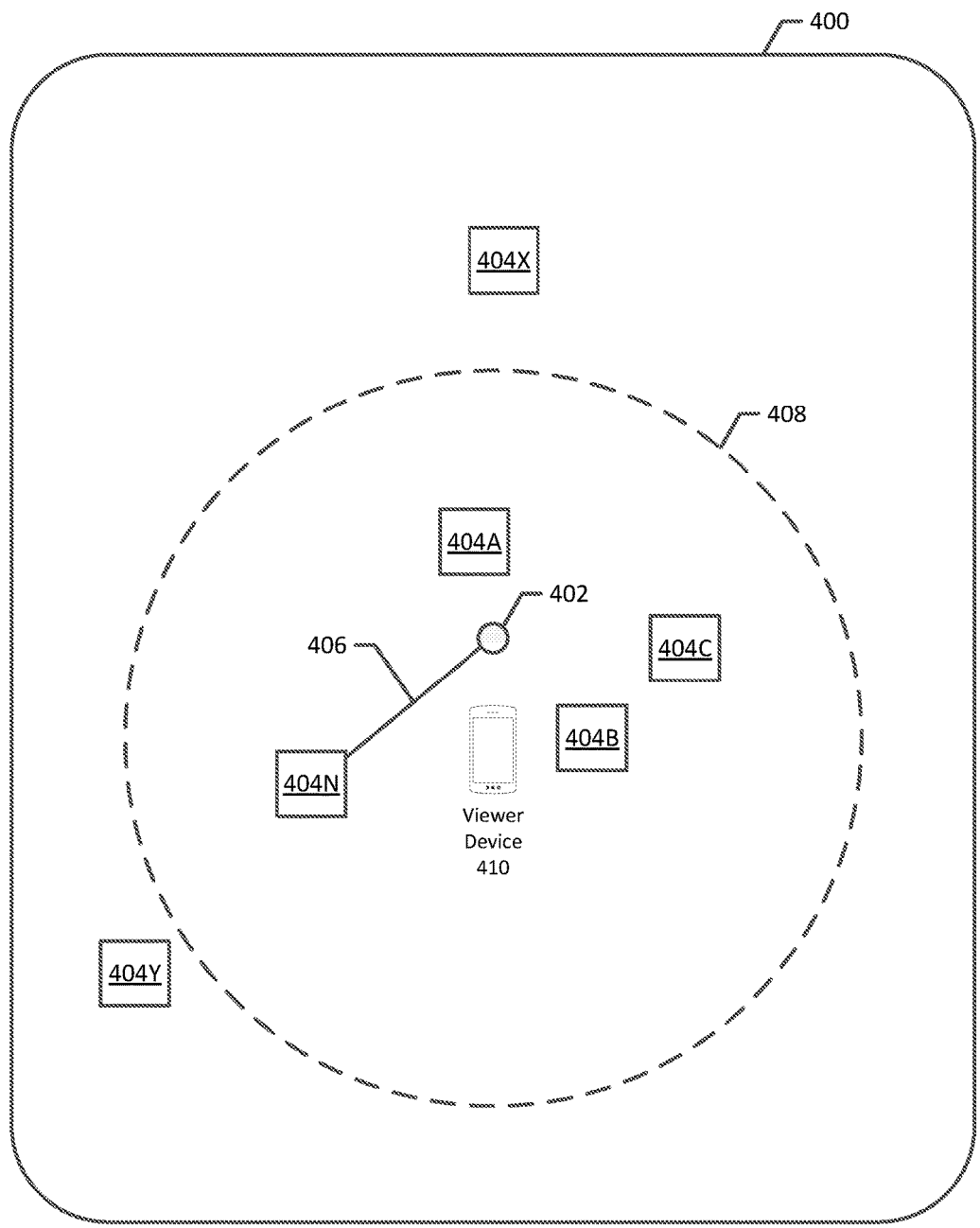

Having thus described certain embodiments of the present invention in general terms, reference will now be made to the accompanying drawings, which are not necessarily drawn to scale, and wherein:

FIG. 1 illustrates an example system within which some embodiments of the present invention may operate;

FIG. 2 illustrates a block diagram of an example device for implementing a data object generation system using special-purpose circuitry in accordance with some embodiments of the present invention;

FIG. 3 illustrates an example data flow interaction between elements of an example device for generating menu data objects and interfaces associated with menu data objects in accordance with some embodiments of the present invention;

FIG. 4 illustrates an example environment in which aspects of example determinations and calculations associated with embodiments of the invention may be visualized.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Various embodiments of the present invention are directed to improved apparatuses, methods, and computer readable media for filtering and modifying option data objects and weighted values associated with such option data objects, which, in some implementations, involves the determination of locations associated with option data objects and potential users of such option data objects and the calculation of a series of distances and distance parameters associated with the option data objects, the user, and the geographic area surrounding the user. In this regard, embodiments of the present invention provide systems, devices, and frameworks that employ distance-based determinations and protocols to assess option data objects and modify weighted values that may be supplied by one or more predictive models associated with the option data objects, resulting in a ranked list or other selected set of option data objects that can be presented to the user via a display of a user's mobile device.

As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the terms "client" and/or "content source" refers to an individual or entity that is a source, and/or is associated with sources, of an option data object, content contained within an option data object, and/or content to be displayed in connection with an option data object. For example, a content source and/or client may be the owner and/or operator of a system that uses option data objects (such as in the form of deal offers) to encourage users to physically travel to a particular location to exercise the option contained in the option data object, and generates, acquires, and/or otherwise facilitates the acquisition of data to be included in an option data object.

As used herein, the term "viewer" refers to an individual or other entity that views and/or otherwise interacts with a rendering of one or more option data objects on a mobile device via a user interface, and by doing so, may interact with systems and/or other entities associated with a content source. Depending on the implementations of the particular systems associated with a viewer and/or a content source, a viewer may be able to make and communicate selections from a rendered set of option data objects via an interface directly and/or indirectly to a content source and/or other related system or entity.

As used herein, "option data object" may include one or more data sets or the like which are associated with a content source and reflect an optional action that can be elected by a user, to cause the performance of an action at a location associated with the content source. An option data object may also include a set of parameters associated with the optional action and/or the content source, including but not limited to a weighted value, such as a weighted value produced by a predictive model, and in indication of an option data object location.

Many particularly advantageous implementations of embodiments of the invention arise in contexts and situations that involve the transmission and presentation to a user of a mobile device of option data objects that are in the form of deal offers (such as offers to purchase goods, services, and/or other resources at a discounted price or in connection with other benefits, for example). In many such example implementations, deals are associated with a particular geographic location, such as a restaurant, retailer, service provider, or other physical location, and the details of the deal may necessitate the user to physically travel to such a location to derive the benefit of the deal. One of the technical, operational challenges that is typical in such contexts and situations involves the transmission and presentation of deal offers that are associated with locations that are too far away from the user to be practical and/or otherwise of interest to the user. This operational challenge is compounded when the presentation of such far-away deals to the user crowds out other deals from the limited display space on a user's mobile device and/or otherwise degrades the user experience associated with applications and/or other software with which the user may be exposed to and interact with deal offers.

Several factors tend to increase the likelihood that such far-away deals are presented to users. One such factor is the general inability of predictive models (which are used, for example, to identify deals that may be of interest to a user) to take into account the nature of travel or other movement of a user. For example, if a user is primarily based in New York City, but happens to travel to Chicago and purchases a deal while in Chicago, the significant distance between New York and Chicago can cause a model (which takes into account the distance between a deal purchase and the user's home) to increase a "score" or other weighted value of the purchased deal, such that other Chicago-based deals are presented to the user and/or the particular purchased Chicago-based deal is presented to other users who may be far outside of Chicago.

Another such factor that tends to contribute to this issue arises with a predictive model that is unable to take into account directionality associated with deals and user travel. Such models implicitly assume that a user who is primarily based in a city is equally likely to travel ten miles (or some other significant distance) to restaurant in an adjacent suburban area, as a user based in the suburban area is to travel the same distance to go to a restaurant in the city. Consequently, such models are unable to recognize that users in cities or other environments with multiple, nearby deals are typically less willing or likely to travel significant distances to partake in a deal.

Another factor that tends to contribute to this issues arises when a predictive model applies rules that tend to favor deals that exhibit certain characteristics over the proximity of a deal to a user. For example, a new deal may be scored or otherwise weighted by a model such that, despite it being associated with a location that is far away from a user, it is nonetheless presented to a user, potentially crowding out a closer deal that is more likely to be attractive to a user.

To solve and address these issues, example implementations of embodiments of the invention determine a deal density of a particular area, along with other indicia of a user's willingness to travel, to adjust scores or other weighted values associated with deals and other option data objects and/or filter out deals of other option data objects that are determined to be too far away from a user. In doing so, such example implementations confront and solve at least two technical challenges: (1) reliably detecting the physical location of the user, and (2) ascertaining the physical locations associated with the deals in a particular area.

Some example implementations contemplate adjusting a weighted value associated with an option data object. In such implementations where a "score" or other weighted value is assigned to a deal (such as through the operation of one or more predictive models), the score may be "deboosted" or otherwise adjusted downward based at least in part on the relative deal densities of a region surrounding a user and the region in which the deal may be found. In an example of such an implementation, the deals in each particular area (such as the deals in each zip code, for example), may be sorted by category and/or subcategory (such as restaurants and/or type of restaurants, retailers and/or type of retailer, service provider and/or type of service, or the like, for example). After sorting, the deal density in each zip code for each category or subcategory of deal may be calculated.

When determining how to adjust the score or other weighted value of a particular deal for a particular user, the deal density for the category or subcategory that includes the particular deal is compared to the deal density at the user's location. For example, if the deal is in an area with a higher deal density that the area associated with the user, the score or other weighted value of the deal may be maintained at its original value. However, if the deal is in an area that is less deal-dense than the area associated with the user, the score or other weighted value may be deboosted or otherwise reduced proportionally to the ratio of the deal location's density to the user location's density. Adjusting the score or other weighted value associated with a deal in this manner allows for the results generated by a predictive model to be adjusted to reflect the tendency for users who are surrounded by numerous deals to travel outside their local area to an area that features fewer deals.

The deal density for a particular zip code may be calculated in a number of different manners. In some example implementations, a deal density in a particular zip code may be calculated and expressed as:

$$\text{Density(zip)} = \sum_{deals} f(\text{distance from deal to zip})$$

In such an example implementation, the function $f$ may be a decreasing function, such as $1/x$, and the set deals may contain all active deals in a particular subcategory, for example. Since f is decreasing, a deal contributes more to the density of a particular location the close it is to that particular location. In an implementation that may be less computationally intense, $f(x)=1$ in situations where the deal is within a particular zip code and $f(x)=0$ otherwise, such that density in a zip code is equal to the number of deals in that zip code.

Upon calculation of the densities for the various subcategories for each zip code, pairs of zip codes and subcategories can be mapped to their respective calculated density, and this data can be stored in a database. When deals are ranked to be presented to a user via a user's mobile device, queries to the database can be used to determine the relative densities of the potentially presented deals and the location of the user, and the deals rescored and re-ranked based on the relative deal densities.

Other example implementations contemplate deboosting or otherwise adjusting a score or other weighted value of a deal or other option data object based on a determination that the option data object is associated with a location outside of a particular radius. Such implementations contemplate establishing a predetermined number of deals that a user may have access too. For example, for deals associated with restaurants, that predetermined number may be fifteen, while for deals associated with gyms, that predetermined number may be three. The predetermined number may be any number, and it may be particularly advantageous to tune the specific predetermined number associated with a category and/or subcategory of option data objects based on the particular nature of the option data objects and the response by users to various predetermined number thresholds.

Regardless of how the predetermined number is set, a minimum radius necessary to capture the predetermined number of deals may be calculated for each category or subcategory in each zip code. Any deals located outside of the circle defined by the minimum radius may then have their scores or other weighted values heavily deboosted or otherwise adjusted downward. As a result, faraway deals would be excluded from presentation to a user if a sufficient number of deals were available nearby.

The radius contemplated in such example implementations may be calculated in any of a number of ways. For example, in a series of offline operations, the appropriated radius for each subcategory within each zip code may be calculated. For example, all active deals in a given subcategory may be sorted by distance from the given zip code, and the top k closest deals may be selected, where k is the predetermined number associated with that subcategory. Then, the smallest radius may be selected such that all k deals are within the radius. Stated differently, the radius may be set such that it is the distance of the kth closest deal from the zip code. In some situations, it may be advantageous to apply upper and/or lower bounds to the radius, depending on the nature of the deal or other option data object. For example, it may not be necessary to deboost or otherwise restrict deals associated with restaurants that are within a distance of 4-5 miles, regardless of the density of the area. Likewise, in the case of restaurant deals, deal that are 40-50 miles or more from a location may need to be deboosted, regardless of how sparse a deal density may be.

Upon calculation of the radii for the various subcategories for each zip code, pairs of zip codes and subcategories can be mapped to their respective calculated radii, and this data can be stored in a database. When deals are ranked to be presented to a user via a user's mobile device, queries to the database can be used to determine whether the score or other weighted value of a particular deal or other option data object should be adjusted based at least in part on the sum of the calculated radius and the distance between the user's mobile device and a reference point within the geographic area, and a comparison of this summed radius to the location of the particular deal or other option data object.

Some advantageous example implementations incorporate information about one or more locations and/or areas that are frequently visited by the user. In some situations, the user's most visited zip codes may be known. In other situations, such as when a user uses a mobile device that is capable of interfacing with global positioning system ("GPS") satellites or other location-determining network infrastructure, a user's location (such as latitude and longitude coordinates or another indication of location) may be known. Regardless of the mechanism through which a user's current location or set of typically visited locations is derived, deals and/or other option data objects may be presented to a user based not only on where the user currently is, but where they may be in the near term. For example, if a user travels from work in an urban center to home in a suburban area, deals may be presented to the user based not only on their current position (such as at work), but also based on the prediction that deals close to home and/or on the route home may be attractive to the user. Upon the purchase of a particular deal, information about that deal (such as the distance associated with that deal) may be attributed to a user's frequently visited location and/or the current location of the user, based on the smallest distance between such location and the deal. Such example implementations capture information that is particularly useful in ascertaining whether a user is willing to travel a particular distance for a deal, as opposed to a willingness to select a deal that happens to coincide with a location to which the user was already planning to travel to.

Some particularly advantageous implementations use a radius-based approach to enable the adjustment of scores and/or other weighted values associated with option data objects to reflect a localized density of deals and/or other option data objects. In such implementations that arise in situations where there are many locations associated with multiple option data objects within a relatively small geographic area, the radius will be relatively small. In implementations where the density of option data objects and their corresponding locations is low, the radius will be large. Such example implementations also contemplate adjusting a ranking of option data objects within each category and/or subcategory of option data objects such that the option data objects that are associated with locations that fall within the calculated radius are ranked above those that fall outside the radius, but otherwise leaving the relative rankings unchanged.

FIG. 4 depicts an example environment in which the determinations and other calculations associated with some such implementations may be more readily visualized. One of the goals of example implementations of embodiments of the invention is to filter lists of option data objects based on distance, such that scores and/or other weighted values associated with such option data objects that are located far away from a user are scaled downward. This can be particularly advantageous in situations where the option data object is an offer of a deal associated with a location to which a user must travel to obtain the benefit of the deal. For example, a deal may be associated with a restaurant, a retail location and/or a service location. When determining whether or not to scale a score downward or "deboost" a deal, a radius associated with a zip code or other geographic area and each subcategory of deal or other option data object is computed. When scoring a deal or other option data object for a particular user, a deboost or other downward scaling is applied if the location associated with the option data object is outside the radius. One approach to calculating and applying such a radius can be done in two main parts: an offline portion and an online portion.

With reference to FIG. 4, geographic area 400 is a predefined geographic area, such as a zip code, neighborhood, or other defined geographic space. It will be appreciated that while FIG. 4 is shown with relatively regular boundaries for the purposes of clarity, other shapes are contemplated, including but not limited to any shapes associated with or otherwise similar to those of existing zip codes, area code regions, county lines, city and/or neighborhood limits, or the like. FIG. 4 also contains reference point 402. In many example implementations, reference point 402 will be the center of geographic area 400. However, implementations of embodiments of the invention contemplate locations of reference point 402 that may not be the center of geographic area 400, and may be any point within a zip code and/or other relevant geographic area.

Example implementations of the offline portion of the calculation referenced above may be done in the following manner, with reference to FIG. 4. In each zip code or other geographic area, such as geographic area 400, each option data object available in that zip code or other area is grouped by category and/or subcategory. In FIG. 4, a number of option data objects are each associated with a location within geographic area 400, which are shown as option data object locations 404A, 404B, 404C, 404N, 404X and 404Y. For purposes of clarity, the option data objects associated with each option data object location 404 are in the same subcategory. For example, they all may be restaurants that serve a particular type of food (such as pizza parlors, bakeries, or diners, for example), businesses that sell the same or similar type of goods (such as shoe stores, sporting goods stores, or boutiques, for example), or service providers that offer the same or similar services (such as dry cleaners, gyms, or veterinarians, for example).

For each option data object within a particular subcategory, the distance from the reference point 402 to the relevant option data object location is calculated, and the option data objects are sorted by distance. Then, the distance associated with a predetermined number is selected as a baseline radius for the particular option data object type in that particular geographic area. As shown in FIG. 4, the predetermined number is N, such that the distance from reference point 402 to option data object location 404N is set as the baseline radius 406. The baseline radius 406 is then added to the distance between the a viewer device 410 and the reference point 402, and used to define a circular region 408, which is shown as being centered on the location of the viewer device 410, such that there are N option data objects of a particular type within the circular region 408 surrounding the viewer device 410. As shown in FIG. 4, option data object locations 404X and 404Y fall outside the circular region 408, and, in some example implementations, one or more scores associated with option data objects at locations 404X and 404Y may be adjusted such that the option data objects are not presented to the viewer device 410 and/or are deemphasized with respect to other, closer option data objects.

Example implementations of the online portion of the calculation referenced above may be done in the following manner, with continued reference to FIG. 4. As shown in FIG. 4, a user and their mobile device, such as viewer device 410, may be located within geographic area 400. By entering input via the viewer device 410, a user may request that a set of option data objects, such as deals in a particular category or subcategory available in the geographic area 400, be presented via a display on viewer device 410. For example, a user may wish to see all of the deals associated with restaurants in the local area. In such situations, a score or other weighted value is associated with each such option data object, typically through the operation of one or more predictive models. Regardless of the precise approach used to associate a score or other weighted value to the option data objects, the online portion of the calculation referenced above contemplates a user and one or more option data objects, each such option data object being associated with a score or other weighted value After receiving an indication that the user has requested a particular set of option data objects (such as the option data objects in a particular subcategory with option data object locations within a particular zip code) the radius r corresponding to the zip code the user is currently in and the subcategory of option data objects requested by the user is retrieved from a database. After retrieving the appropriate radius, the distance $dist_1$ is computed as the distance between a particular option data object location and the particular location of the user. In some example implementations, the location of the user is determined based on information obtained from viewer device 410, which may be capable of interacting with a GPS system, a cellular communication system, and/or other location-determining systems to ascertain the location of the viewer device 410.

In addition to calculating the distance between the user and the option data object location, the distance $dist_2$ between the user and the center of the zip code or other reference point, such as reference point 402, is calculated. As with the calculation of distance $dist_1$, the distance $dist_2$ may use the location of the viewer device 410 as a proxy for the location of the user. Upon the calculation of $dist_2$ and $dist_1$, a combined distance dist is determined by summing $dist_2$ and the radius r. If the $dist_1$ distance is less than the combined dist measurement, the score or other weighted value associated with the option data object is scaled such that it will be highly ranked for subsequent presentation to the user. If the $dist_1$ distance is greater than the combined dist measurement, the score or other weighted value associated with the option data object is maintained at its previous value. When a scaling factor (such as a factor of 0.1 or 0.01, or the like) is applied to the option data objects associated with locations that are near the user, these option data objects can be presented in a way that preserves their relative ranking with respect to each other, while elevating the ranking of nearby option data objects above similar option data objects that are associated with farther away locations.

It will be appreciated that while many of the examples presented herein use the term "distance" and may reference a straight-line distance between two points, some example implementations contemplate other metrics associated with the displacement of two points with respect to each other and/or the movement from one point to another. For example, some implementations contemplate performing one or more of the calculations described herein based on an estimated driving time, transit time, and/or other travel time needed to move from one point (such as an option data object location and a reference point and/or a user location) and/or a distance that takes into account physical features, such as the routing of roads, public transportation routes, surface topology, geographic features such as mountains, rivers, lakes, or the like, and other aspects that bear on the ability to move from one point to another.

FIG. 1 shows an example system environment 100 in which implementations involving the efficient filtering and modification of option data objects and weighted values associated with option data objects may be realized. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the filtering of option data objects and/or the modification of weighted values associated with option data objects based at least in part on the locations associated with each option data object, the location of a user who has transmitted a request for option data objects, and the relative density of option data objects within a particular geographic region. Some such embodiments leverage a hardware and software arrangement or environment for request data object-to-network response asset pairing in accordance with the present invention.

As shown in FIG. 1, an object filtering system 102 includes an online object filtering system module 102A which is configured to receive, process, transform, transmit, communicate with and evaluate option data objects, content and other information associated therewith, and related interfaces via a web server, such as object filtering system server 102B and/or object filtering system device 102D. The object filtering system server 102B is connected to any of a number of public and/or private networks, including but not limited to the Internet, the public telephone network, and/or networks associated with particular communication systems or protocols, and may include at least one memory for storing at least application and communication programs.

It will be appreciated that all of the components shown FIG. 1 may be configured to communicate over any wired or wireless communication network including a wired or wireless local area network (LAN), personal area network (PAN), metropolitan area network (MAN), wide area network (WAN), or the like, as well as interface with any attendant hardware, software and/or firmware required to implement said networks (e.g. network routers and network switches). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to TCP/IP based networking protocols may be used in connection with system environment 100 and embodiments of the invention that may be implemented therein or participate therein.

As shown in FIG. 1, object filtering system 102 also includes an object control database 102C that may be used to store information associated with option data objects, locations associated with such option data objects, rule sets to be applied in connection with the filtration and modification of option data objects, option object systems and/or content provided thereby or associated therewith, viewer systems and/or information provided thereby or associated therewith, and/or other information related to the filtration and modification of option data objects and/or associated weighted values, which can be accessed by the object filtering system module 102A, the object filtering system server 102B, and/or the object filtering system device 102D. While FIG. 1 depicts object filtering system database 102C as a single structure, it will be appreciated that object filtering system database 102C may additionally or alternatively be implemented to allow for storage in a distributed fashion and/or at facilities that are physically remote from the each other and/or the other components of object filtering system 102. Object filtering system 102 is also shown as including object filtering system device 102D which may take the form of a laptop computer, desktop computer, or mobile device, for example, to provide an additional means (other than via a user interface of the object filtering system server 102B) to interface with the other components of object filtering system 102 and/or other components shown in or otherwise contemplated by system environment 100.

Option data objects, option data object information and/or additional content or other information to be associated with one or more option data objects may originate from a content source system such as option object system 104. A user of option object system 104 may use a content source device 104B, such as a laptop computer, desktop computer, or mobile device, for example, to interface with an option object module 104A to generate option data object information and/or information to be included in an option data object, such as an option data object location, a weighted value associated with an option data object, and/or other information to incorporate into and/or associate with an option data object and otherwise be processed by object filtering system 102. While only one option object system 104 is depicted in FIG. 1 in the interest of clarity, it will be appreciated that numerous other such systems may be present in system environment 100, permitting numerous content sources to develop and transmit content and other information associated with option data object to object filtering system 102. In some instances, option object system 104 may also incorporate an option object server 104C. Such implementations may be particularly advantageous in situations where an option object system 102 interfaces with numerous other sources of option data objects, and applies one or more predictive models, through the interaction of option object module 104A and option object server 104C. For example, a plurality of option data objects may be in the form of deal offers that may be presented to a particular viewer via a viewer device that is configured to interact with other system components within environment 100. In such a situation, option object system may generate, receive, and/or otherwise obtain a plurality of deal offers, and apply one or more predictive models to generate a score or other weighted value that estimates the likelihood that the viewer will select or otherwise elect a particular deal. The option object system 104 may also receive or otherwise ascertain information about a location associated with the option data object. Consequently, option object system 104 or a similar system can then pass a set of option data objects (the deal offers, in this example instance), which include and/or are otherwise associated with an identification of an option data object location and a weighted value derived from the operation of a predictive model to the object filtering system 102.

As shown in FIG. 1, system environment 100 also includes viewer system 106, which comprises a viewer module 106A and a viewer device 106B. While only one viewer system 106 is depicted in FIG. 1 in the interest of clarity, it will be appreciated that numerous additional such systems may be present in system environment 100, permitting numerous viewers to request and/or interact with one or more option data objects, and communicate with the object filtering system 102. Viewer device 106B may comprise and/or incorporate a laptop computer, desktop computer, mobile device, or the like, for example, and is configured to interface with a viewer module 106A to interact with object filtering system 102. The viewer system 106 is also capable of communicating with object filtering system 102 to provide information that the object filtering system 102 may need when determining whether and how filter and modify option data objects and weighted values associated with option data objects. For example, viewer system 106 may, such as via the capabilities of viewer device 106B ascertain the location of viewer system 106 through the use of a global positioning system (GPS) interface, cellular location protocols, and/or other location protocols.

Overall, and as depicted in system environment 100, object filtering system 102 engages in machine-to-machine communication with option object system 104 and viewer system 106, via one or more networks, to facilitate the filtering and modification of option object information, such as deal information and weighted values generated by predictive models regarding such deals or other option data objects received from option object system 104, and the transmission of such filtered and/or modified option data objects to viewer system 106.

The object filtering system 102 may be embodied by one or more computing systems, such as apparatus 200 shown in FIG. 2. As illustrated in FIG. 2, the apparatus 200 may include a processor 202, a memory 204, input/output circuitry 206, communications circuitry 208, categorization circuitry 210, and customization circuitry 212. The apparatus 200 may be configured to execute any of the operations described herein, including but not limited to those described in connection with FIG. 1, FIG. 3, and FIG. 4.

Regardless of the manner in which the apparatus 200 is embodied, the apparatus of an example embodiment is configured to include or otherwise be in communication with a processor 202 and a memory device 204 and optionally the input/output circuitry 206 and/or a communications circuitry 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 3 is a block diagram illustrating a set of operations 300 performed, such as by the apparatus of FIG. 2, in accordance with an example embodiment of the present invention. It will be appreciated that the apparatus 200, through the operation of the processor 202, memory 204, user interface 206, communication interface 208, and/or any other components used in connection therewith, are capable of performing each of the operations described herein with respect to FIG. 3 and depicted or otherwise contemplated therein.

Many example implementations of the operations 300, the various devices capable of performing the operations 300 and/or other embodiments of the invention are particularly advantageous in contexts where option data objects take the form of deal offers that are associated with particular locations within a predefined geographic area, and are structured such that a user must physically travel to the particular location associated with the option data object to complete the deal associated with the deal offer, such as through the acquisition of particular goods, services, and/or other resources.

As such, and as shown at block 302, the apparatus 200 is capable of determining a triangulation location of a user. Example implementations of block 302 contemplate a user equipped with a user device, such as viewer device 106B or another mobile device that is capable of detecting a location of the device, such as through interaction with a GPS system, cellular network, or other system that allows a device to determine its location through triangulation. As noted elsewhere herein, embodiments of the invention are aimed, at least in part, on reducing the likelihood that a user who requests a set of option data objects will be presented with option data objects that are associated with locations that are too far away from the user. For example, a user in a particular area who is seeking deal offers associated with restaurants may not be interested in travelling a far distance to go to a restaurant, particularly when there are multiple deal offers available associated with restaurants that are located closer to the user. As such, determining a triangulation location of the user permits the apparatus 200 and/or another system interacting with the apparatus 200 to identify the location of the user's mobile device, and incorporate that location into distance-based calculations and processes, such as the calculations and processes described herein, including but not limited to those discussed in connection with FIG. 4. In some example implementations, such as when the apparatus 200 is incorporated into the user's mobile device, determining the triangulation location may be done directly through the operation of the mobile device, for example. In situations where the apparatus 200 is located remotely from the mobile device, determining the triangulation location may include receiving an indication of the location via a transmission from the mobile device. In some example implementations, it may be advantageous to incorporate into the determination or receipt of the triangulation location an indication of a location to which the user intends to travel. For example, a user may indicate that they are en route or otherwise intend to be in a different location than their present location at a particular time in the future. In some example implementations, it may be advantageous to incorporate into the determination or receipt of the triangulation location an indication of a triangulation location where the user is frequently located, such as a triangulation location associated with the user's home and/or place of work.

As shown at block 304, the apparatus 200 is also capable of determining a predefined geographic area that encompasses the triangulation location of the user. As noted above, particularly with reference to FIG. 4, some example implementations contemplate the filtering and modification of option data objects that are associated with locations within a particular zip code. However, it will be appreciated that any of the predefined geographic areas discussed herein, including but not limited to cities, neighborhoods, other geographic regions, may be used in implementations of block 304. In some example implementations of block 304, determining the predefined geographic area that encompasses the triangulation locations includes querying a database, such as filtering system database 102C, for example, with the triangulation location and receiving as a return to the query an identification of the relevant geographic area (such as an identification of the zip code, for example).

As shown at block 306, the apparatus 200 is also capable of receiving a predetermined distance parameter associated with the predefined geographic area. In many advantageous implementations of block 306, the predetermined distance parameter is the radius associated with a particular subcategory of deals or other option data objects as discussed above herein, including but not limited to the calculations discussed in connection with FIG. 4. For example, as part of an offline calculation, after ranking the deal offers and/or other option data objects based on their distance from a reference point, such as a center of a zip code or other reference point, such as reference point 402, the radius or other predetermined distance may be set as the distance (or as noted above, estimated travel time or other travel-based metric) from the reference point to the Nth closest relevant location, such that N number of deal offers or other option data objects are associated with locations within an area defined by the radius. In some implementations of block 306, such as implementations that contemplate the calculation of a radius or other predetermined distance as an offline procedure, receiving the predetermined distance associated with the predefined geographic area may include receiving an indication of the predefined distance from a database, such as filtering system database 102C.

As shown in block 308, the apparatus 200 is also capable of receiving a set of option data objects associated with the user. As noted elsewhere herein, many implementations of embodiments of the invention arise in contexts where a user requests to see a set of deal offers within a particular category or subcategory (such as types of restaurants, particular types of service providers, or the like). In some such implementations, the apparatus 200 or a related device may receive a set of such deal offers or other option data objects from an option object system 104 or other source of option data objects. Any approach to generating option data objects and any approach to receiving a set of such option data objects may be used in connection with implementations of block 308.

As shown in block 310, the apparatus 200 is also capable of extracting a set of option data object parameters from each option data object within the set of option data objects. Implementations of block 310 contemplate option data objects that include one or more option data object parameters. Such option data object parameters may include, but are not limited to, information describing optional action contained within the option data object (such as the details of a deal offer, for example), an identification of a location associated with the option data object (such as the location of the restaurant, retailer, service provider, or other entity associated with the deal offer or other option data object), and a weighted value associated with the option data object (such as a score or other weighted value generated through the operation of one or more predictive models). Any approach to extracting the set of option data object parameters may be used, and may be dependent on the particular structure and nature of the option data object.

As noted herein, many particularly advantageous implementations of embodiments of the invention contemplate filtering option data objects and/or modifying weighted values associated with option data objects based on calculated distances and distance-based restrictions. As such, extracting an identification of a location associated with each option data object is, in some instances, necessary to facilitate the calculation of, for example the a relevant radius, and distances between locations associated with an option data object and a reference point and/or a user location.

As shown in block 312, the apparatus 200 is also capable of calculating, based at least in part on the location associated with the option data object, the triangulation location of the user, and the predefined geographic area, a distance associated with the option data object. In many example implementations of block 312, the distance associated with the option data object is the distance dist, as described above with reference to FIG. 4 and the related online portion of the calculation. For example, the distance between a particular option data object location (such as the location where a deal offer can be exercised), and the triangulation location of a user can be combined with the distance between the user and the center of the zip code or other reference point, (such as reference point 402, for example) to determine a distance associated with the option data object. While particular calculations are presented herein, including but not limited to those set out in connection with FIG. 4, any computation that takes into account a distance or travel time associated with a particular option data object, a user, and a reference point can be used in example implementations of block 312.

As shown in block 314, the apparatus 200 is also capable of determining whether the distance associated with the option data object exceeds the predetermined distance parameter. In some example implementations of block 314, the distance $dist_1$, as calculated in accordance with the discussion of FIG. 4, is compared against a region associated with a calculated radius, such as region 408 shown and discussed in connection with FIG. 4. However, in some implementations, additional rules or other limits may be applied to the predetermined distance parameter. For example in areas of low option data object density (such as when deal offers associated with similarly categorized entities are widely spaced) an upper limit may be imposed on the predetermined distance, to prevent the calculated radius for defining an impractically large area. Similarly, in areas of high option data object density (such as areas where there are multiple restaurants located within close proximity of each other), the predetermined distance may be extended to prevent artificially excluding potentially relevant deal offers or other option data objects that are only a short distance away from those within the calculated radius.

As shown at block 316, the apparatus 200 is also capable of, in response to determining whether the distance associated with the option data object exceeds the predetermined distance parameter, calculating an updated weighted value associated with the option data object. In some example implementations of block 316, upon determining that the distance associated with a particular deal offer or other option data object exceeds the predetermined distance, a scaling factor is applied such that option data objects that are associated with a shorter distance are ranked more highly than those associated with a longer distance. In some such example implementations, apparatus 200 functions to rescale and/or re-rank a series of deal offers or other option data objects received from an option object system, such as option object system 104. As such, the weighted values generated by one or more predictive models for each option data object can be adjusted and/or customized, in real-time or near-real-time, based on the location of a user's mobile device at a particular time. Particularly in situations where the weighted values received from a predictive model or other option object system are rescaled, the relative ranking of near-located option data objects can be maintained, as can the relative ranking of far-located option data objects. As such, on a user-by-user and location-by-location basis, the information reflected by the weighted value generated by the predictive model or models can be preserved, and updated to reflect the particular situational circumstances of the user's location and the option object density of the surrounding area.

As described above, FIG. 3 illustrates a flowchart of an apparatus, such as apparatus 200, a method, and a computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart supports combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory coupled to the processor, wherein the processor is configured to at least:
    determine a triangulation location of a user;
    determine a predefined geographic area that encompasses the triangulation location of the user;
    receive a predetermined distance parameter associated with the predefined geographic area;
    receive a set of option data objects associated with the user;
    extract a set of option data object parameters from each option data object within the set of option data objects, wherein the option data object information comprises:
        an identification of a location associated with the option data object; and
        a weighted value associated with the option data object;
    calculate, based at least in part on the location associated with the option data object, the triangulation location of the user, and the predefined geographic area, a distance associated with the option data object;
    determine whether the distance associated with the option data object exceeds the predetermined distance parameter; and
    in response to determining whether the distance associated with the option data object exceeds the predetermined distance parameter, calculate an updated weighted value associated with the option data object.

2. The apparatus of claim 1, wherein the set of option data objects associated with the user comprises a set of option data objects associated with a category selected by the user.

3. The apparatus of claim 1, wherein the triangulation location of the user is based at least in part on a triangulation location of a mobile device associated with the user.

4. The apparatus of claim 1, wherein the predetermined distance parameter associated with the predefined geographic area is based at least in part on a density of option data objects within the predefined geographic area.

5. The apparatus of claim 1, wherein the predetermined distance parameter associated with the predefined geographic area is based at least in part on a distance between a reference point within the predefined geographic area and a location associated with one or more option data objects.

6. The apparatus of claim 5, wherein the distance associated with the option data object is based at least in part on a distance between the location associated with the option data object and the triangulation location of the user and the distance between the triangulation location of the user and the reference point associated with the predefined geographic area.

7. The apparatus of claim 6, wherein calculating an updated weighted value associated with the option data object comprises associating a scaling factor with the option data object.

8. A computer program product comprising at least one non-transitory computer-readable storage medium having computer-executable program code instruction stored therein, the computer-executable program code instructions comprising program code instructions configured to:
determine a triangulation location of a user;
determine a predefined geographic area that encompasses the triangulation location of the user;
receive a predetermined distance parameter associated with the predefined geographic area;
receive a set of option data objects associated with the user;
extract a set of option data object parameters from each option data object within the set of option data objects, wherein the option data object information comprises:
an identification of a location associated with the option data object; and
a weighted value associated with the option data object;
calculate, based at least in part on the location associated with the option data object, the triangulation location of the user, and the predefined geographic area, a distance associated with the option data object;
determine whether the distance associated with the option data object exceeds the predetermined distance parameter; and
in response to determining whether the distance associated with the option data object exceeds the predetermined distance parameter, calculate an updated weighted value associated with the option data object.

9. The computer program product of claim 8, wherein the set of option data objects associated with the user comprises a set of option data objects associated with a category selected by the user.

10. The computer program product of claim 8, wherein the triangulation location of the user is based at least in part on a triangulation location of a mobile device associated with the user.

11. The computer program product of claim 8, wherein the predetermined distance parameter associated with the predefined geographic area is based at least in part on a density of option data objects within the predefined geographic area.

12. The computer program product of claim 8, wherein the predetermined distance parameter associated with the predefined geographic area is based at least in part on a distance between a reference point within the predefined geographic area and a location associated with one or more option data objects.

13. The computer program product of claim 12, wherein the distance associated with the option data object is based at least in part on a distance between the location associated with the option data object and the triangulation location of the user and the distance between the triangulation location of the user and the reference point associated with the predefined geographic area.

14. The computer program product of claim 13, wherein calculating an updated weighted value associated with the option data object comprises associating a scaling factor with the option data object.

15. A method for distance-based filtering and modifying option data objects, the method comprising:
determining a triangulation location of a user;
determining a predefined geographic area that encompasses the triangulation location of the user;
receiving a predetermined distance parameter associated with the predefined geographic area;
receiving a set of option data objects associated with the user;
extracting a set of option data object parameters from each option data object within the set of option data objects, wherein the option data object information comprises:
an identification of a location associated with the option data object; and
a weighted value associated with the option data object;
calculating, based at least in part on the location associated with the option data object, the triangulation location of the user, and the predefined geographic area, a distance associated with the option data object;
determining whether the distance associated with the option data object exceeds the predetermined distance parameter; and
in response to determining whether the distance associated with the option data object exceeds the predetermined distance parameter, calculating an updated weighted value associated with the option data object.

16. The method of claim 15, wherein the set of option data objects associated with the user comprises a set of option data objects associated with a category selected by the user.

17. The method of claim 15, wherein the predetermined distance parameter associated with the predefined geographic area is based at least in part on a density of option data objects within the predefined geographic area.

18. The method of claim 15, wherein the predetermined distance parameter associated with the predefined geographic area is based at least in part on a distance between a reference point within the predefined geographic area and a location associated with one or more option data objects.

19. The method of claim 18, wherein the distance associated with the option data object is based at least in part on a distance between the location associated with the option data object and the triangulation location of the user and the distance between the triangulation location of the user and the reference point associated with the predefined geographic area.

20. The method of claim 19, wherein calculating an updated weighted value associated with the option data object comprises associating a scaling factor with the option data object.

* * * * *